United States Patent
Bos et al.

(10) Patent No.: US 9,596,869 B2
(45) Date of Patent: Mar. 21, 2017

(54) SYSTEM, METHOD, AND CAROUSEL DEVICE FOR SKIN REMOVAL FROM DEFEATHERED WHOLE LEG OR DRUMSTICK POULTRY PRODUCTS

(71) Applicant: MAREL STORK POULTRY PROCESSING B.V., Boxmeer (NL)

(72) Inventors: Jan Willem Bos, Haps (NL); Erik Hendrikus Werner Peters, Boxmeer (NL); Maurice Eduardus Theodorus Van Esbroeck, Bemmel (NL); Pascal Peter André Van Kempen, Boxmeer (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 15/030,294

(22) PCT Filed: Nov. 11, 2014

(86) PCT No.: PCT/NL2014/050779
§ 371 (c)(1),
(2) Date: Apr. 18, 2016

(87) PCT Pub. No.: WO2015/072851
PCT Pub. Date: May 21, 2015

(65) Prior Publication Data
US 2016/0270413 A1    Sep. 22, 2016

(30) Foreign Application Priority Data

Nov. 13, 2013   (NL) .................................... 2011793
Jul. 23, 2014   (NL) .................................... 2013242

(51) Int. Cl.
A22C 25/17   (2006.01)
A22C 21/00   (2006.01)
A22B 5/16    (2006.01)

(52) U.S. Cl.
CPC ............ *A22C 21/0092* (2013.01); *A22B 5/16* (2013.01); *A22C 21/0046* (2013.01)

(58) Field of Classification Search
CPC ...... A22C 21/0092; A22C 17/12; A22C 25/17
(Continued)

(56) References Cited

U.S. PATENT DOCUMENTS 4,459,721 A * 7/1984 Hill ...................... A22C 25/17
                                                 452/130
4,723,339 A * 2/1988            van de
                          Nieuwelaar ........ A22C 21/0092
                                                 452/130

(Continued)

FOREIGN PATENT DOCUMENTS

EP        0519570 A1   12/1992
EP        2223605 A1    9/2010
WO    WO 00/59311 A2   10/2000

*Primary Examiner* — Richard Price, Jr.
(74) *Attorney, Agent, or Firm* — Birch, Stewart, Kolasch & Birch, LLP (57) ABSTRACT

A system for skin removal from defeathered whole leg or drumstick poultry products, includes a poultry products conveyor including a track including a circle arc track portion, and a series of poultry product carriers which are spaced apart from one another in the direction of the track and which are movable along said track. Each poultry product carrier is adapted to hold at least one defeathered whole leg or drumstick poultry product at the ankle joint thereof such that the poultry product is conveyed hanging from said carrier. A carousel skin removal device is arranged along the track of the poultry products conveyor at the circle arc track portion and adapted to remove skin from whole leg (Continued)

or drumstick poultry products held and conveyed by the poultry products conveyor.

20 Claims, 9 Drawing Sheets

(58) Field of Classification Search
USPC .............. 452/106, 111–114, 125, 127, 130
See application file for complete search history.

(56) References Cited

U.S. PATENT DOCUMENTS

| | | | | |
|---|---|---|---|---|
| 5,173,563 | A | * | 12/1992 | Gray ..................... F41A 23/02 42/94 |
| 5,197,917 | A | | 3/1993 | Verbakel et al. |
| 5,505,657 | A | | 4/1996 | Janssen et al. |
| 5,890,956 | A | * | 4/1999 | Habenicht .......... A22C 21/0023 452/154 |
| 7,232,364 | B2 | * | 6/2007 | Hibbard ............... C11D 17/049 15/104.93 |
| 7,959,499 | B2 | * | 6/2011 | Chattin .................. A22C 21/06 452/116 |
| 8,303,383 | B2 | * | 11/2012 | Jansen ................... A22C 21/06 452/106 |
| 8,632,380 | B2 | * | 1/2014 | Stooker ............. A22C 21/0076 452/136 |

\* cited by examiner

SYSTEM, METHOD, AND CAROUSEL DEVICE FOR SKIN REMOVAL FROM DEFEATHERED WHOLE LEG OR DRUMSTICK POULTRY PRODUCTS

BACKGROUND OF THE INVENTION

1. Field of the Invention

The present invention relates to the removal of skin from defeathered whole leg or drumstick poultry products, primarily from chicken.

2. Description of Background Art

In the field a whole leg poultry product is a commonly accepted term to identify a poultry leg formed by the drumstick and the thigh connected to the drumstick. Other terms used for this product are anatomical leg and separated leg.

In EP 519 570 a system for skin removal from defeathered whole leg poultry products is disclosed. This known system comprises a poultry products conveyor with a track and a series of poultry product carriers which are spaced apart from one another in the direction of the track and which are movable along said track. Each poultry product carrier is adapted to hold a defeathered whole leg poultry product at the ankle joint thereof, also called tarsal joint, such that the poultry product is conveyed hanging from said carrier.

In EP 519 570 it is explained that the poultry product may be passed along a cutting device arranged along the track of the poultry products conveyor in order to make one or more incisions and then along a skin removal device arranged along the track of the poultry products conveyor in order to remove skin from the poultry products held and conveyed by the poultry products conveyor. It is explained, as is commonly done in the field, that the skin is cut through at the knee joint, and that subsequently the thigh skin is removed whilst skin remains on the drumstick. In an embodiment of this prior art system the skin removal device comprises a left and right skin removal assembly, each adapted to remove skin from the thigh of a whole leg poultry product. Each skin removal assembly comprises two rotary driven skinning rollers having an axis of rotation and being driven in opposite directions so that the skin is gripped in the nip between the rollers and pulled from the thigh.

In EP 519 570 the skinning rollers of each assembly are arranged with their axes of rotation parallel to the track of the conveyor in a substantially horizontal orientation, possibly pivotable about an axis transverse to the skinning rollers to obtain a fixed or variable slanted position. The thigh of the hanging whole leg poultry product is then dragged by the conveyor over the skinning rollers, and as a result the thigh skin is gripped by the rotating skinning rollers and the skin is pulled from the thigh.

WO00/5931, on which the preamble of claim 1 is based, discloses in particular with reference to FIGS. 6, 7, and 8 therein a similar system as discussed with reference to EP 519 570. In this prior art document it is discussed that drumstick poultry products, in particular of chicken, are conveyed whilst hanging from a carrier. Each carrier carries two drumsticks in side-by-side arrangement; first along a cutting device that makes a cut in each drumstick near the ankle joint and then along a skin removal device. As in EP 519 570 this device has two skin removal assemblies that each comprises two rotary driven skinning rollers having an axis of rotation and being driven in opposite directions so that the skin is gripped in the nip between the rollers and pulled from the drumstick. The skinning rollers of each assembly are arranged with their axes of rotation parallel to the track of the conveyor in a substantially horizontal orientation.

In WO00/59311 it is indicated that the drumsticks will have the tendency to "dance" on the skinning rollers, leading to poor skin removal results. To counter this effect it is disclosed that the holding part of the carrier is tilted about a horizontal axis relative to the carrier base whilst the carrier passes the skin removal device. The tilting of the holding part causes the drumsticks to be pressed onto the skinning rollers.

The prior art systems are not entirely satisfactory in view of the skin removal results. In particular skin may become torn and thus only fractionally removed and thus requiring undue manual trimming of the poultry product later on. Also occasionally damage to meat of the drumstick or thigh is observed.

SUMMARY OF THE INVENTION

The present invention aims to overcome, or at least reduce, one or more of the above drawbacks by providing a system according to the preamble of claim 1, which is characterized in that the poultry products conveyor is provided with a circle arc track portion, in that the skin removal device comprises a carousel skin removal device which is arranged at said circle arc track portion, and in that the carousel skin removal device comprises:
- a main frame,
- a skin removal assemblies support structure, which is journaled on said main frame to revolve about a vertical main axis,
- a drive assembly adapted to cause a revolving motion of the skin removal assemblies support structure that is synchronized with the passage of the poultry product carriers along the circle arc track portion of the track, wherein the skin removal assemblies support structure supports multiple skin removal assemblies in a circular arrangement thereon, wherein the skin removal assemblies are distributed corresponding to the positions of the whole leg or drumstick poultry products held by the poultry product carriers of the conveyor in their passage along the circle arc track portion of the track, such that each skin removal assembly moves along with a whole leg or drumstick poultry product during the skin removal process.

By provision of the carousel skin removal device for skin removal of whole leg or drumstick poultry products at the circle arc track portion of the conveyor track significant improvements as to the skin removal process can be obtained compared to the mentioned prior art solutions. For example, and most prominently, the duration of the engagement between the skin removal assembly on the one hand and the whole leg or drum stick poultry product on the other hand can be significantly longer. This allows for a relatively slower and more gentle removal of the skin, e.g. by reduction of the speed of rotation of the skinning roller(s) compared to the prior art, resulting in less undue tearing of skin and less potential for damage to meat. Also the use of skin removal assemblies that more or less move along with the conveyed whole leg or drum stick poultry product allows for an improved contact between the two compared to the mentioned prior art.

The system can be readily incorporated in existing poultry processing plants. Also the system can be designed in a constructional simple manner, as will be apparent from the discussion of some embodiments below.

In embodiments the skin removal assemblies are arranged to solely remove skin from the thigh of a whole leg poultry product, wherein the skin removal assemblies are arranged at a distance below the path of the carriers of the conveyor which is such that the drumstick of a whole leg poultry product carried by the poultry product carrier is not engaged by the one or more skinning rollers of the skin removal assembly.

In this embodiment it is considered advantageous if the whole leg product has been subjected to a cutting process ahead of the skin removal, wherein a cut or the like is made in the skin at the level of the knee joint. As explained above such a cutting process is known in the art. The cut may be made just in the skin and not deeper into the whole leg product, but in embodiments the cut in the skin may also be the result of a cut into the meat or even through most of the whole leg product at the level of the knee.

In this embodiment one may provide for a mobile pressing member that moves along with the skin removal assembly and is adapted to engage solely and directly on a thigh of a whole leg poultry product carried by the poultry product carrier. This cause the force to be exerted only on the thigh and not on the drumstick which avoids e.g. undue breaking of the drumstick and allows for enhanced control of the contact pressure.

In embodiments each poultry product carrier comprises a carrier base that is guided along the track, e.g. a wheeled trolley running along a rail forming the track, and further comprises a holding part that is adapted to hold two whole leg or drumstick poultry products at the ankle joint in side-by-side hanging orientation. The holding part is rotatable mounted relative to the carrier base about a vertical axis between indexed rotary positions which include a first rotary position, wherein the holding part is transverse to the track, and a second rotary position, wherein the holding part is aligned with the track. It will be appreciated that such carriers for poultry products are commonly known in the art, e.g. as shown in WO00/59311. When use is made of such carriers it is envisaged that the system comprises an indexing member arranged upstream of the carousel skin removal device in order to cooperate with the holding part ahead of the skin removal carousel device and to bring the holding part in the second rotary position. For example, as is known from WO00/59311, the holding part includes a Geneva drive wheel and the indexing member is a pin arranged to slide into and out of a slot of the Geneva drive wheel to cause the rotation of the holding part. In this second rotary position the two poultry leg products carried by a single carrier hang at circumferentially spaced locations, each opposite one skin removal assembly which are arranged at a corresponding spacing in circumferential direction.

In a practical embodiment the axes of rotation of the at least one rotary driven skinning roller in the skin removal assemblies are arranged vertically so that the at least one skinning roller can be easily brought in contact with the hanging whole leg or drumstick poultry product. In an alternative embodiment it is envisaged that the skin removal devices are not in upright position and are instead arranged in a conical arrangement with the axes of rotation of the skinning rollers extending upward and inward at an angle of between 45° and 80° to the horizontal, preferably at an angle between 60° and 80° to the horizontal.

In preferred embodiments the at least one counter skinning member adjacent the at least one skinning roller is embodied as a second skinning roller having an axis of rotation. It will be appreciated that instead of the provision of two skinning rollers a skin removal assembly could include a driven skinning roller in combination with a shoe or pinch block as counter member as is known in the field of skin removal. Preferably the two skinning rollers having meshing teeth, e.g. helical teeth, and the skinning rollers rotate in counter rotation during operation.

In an embodiment the skin removal assembly is adapted to exert a skin removal force on the skin that has a downward component, so that the skin pulling action includes a significant downward force. This is e.g. possible with the skin removal assembly having two helical toothed skinning rollers that rotate in opposite direction and exert said downward component pull force on the skin.

In a structural simple design the main frame of the carousel skin removal device comprises a gear ring, preferably this gear ring being stationary mounted in the main frame. The skin removal assembly comprises a pinion meshing with this gear ring. The pinion is in turn connected to the at least one driven skinning roller of the skin removal assembly. For example the pinion directly meshes with the driven skinning roller or the pinion is attached to a shaft of the driven skinning roller. If desired another transmission may be present between the skinning roller and the pinion, e.g. including a belt or the like.

In a preferred embodiment the pinion revolves about a corresponding vertical axis relative to the support structure, with the at least one driven skinning roller having its axis of rotation also vertical.

If the gear ring is not stationary a gear ring drive may be provided to provide a revolving motion of the gear ring about the vertical main axis, e.g. in order to be able to control the speed of revolution of the driven skinning roller.

In an embodiment each skin removal assembly is provided with a separate drive motor or a variable speed transmission between the one or more skinning rollers and a drive. For example each skin removal assembly includes an electric motor, e.g. a variable speed electric motor, e.g. directly fitted on a shaft of a driven skinning roller.

Such an arrangement e.g. allows the operation of each skin removal assembly to be individually controllable and/or the one or more skinning rollers being driven at variable speed during their skin removal action, e.g. at an elevated speed in a first period wherein the skin removal assembly grips the skin to be removed and a reduced speed in a second period.

In embodiments the carousel drive assembly comprises a rotary conveyor coupling member that is secured to the skin removal assemblies support structure and is rotatable about the vertical main axis, which conveyor coupling member is provided with formations in a circular arrangement, which formations each interlock with a poultry product carrier so that the conveyor coupling member, and thereby the skin removal support structure, is entrained by the passing poultry carriers and made to revolve about the vertical main axis. This allows for a simplification of the design, as the revolving motion of the carousel device is derived from the conveyor motion and also an effective position control of the skin removal assemblies with respect to the poultry products is achieved.

In an embodiment the carousel skin removal device comprises multiple pressing devices supported by a pressing devices support structure in a circular arrangement thereon, which pressing devices support structure is journaled on the main frame to revolve about the vertical main axis and is adapted to revolve synchronized with the skin removal assemblies support structure. Herein each pressing device is adapted to cause a contact pressure between—on the one hand—one or more whole leg or drumstick poultry products held by a poultry product carrier of the conveyor whilst passing along the circle arc track portion of the track and—on the other hand—the skinning roller and counter skinning member of a skin removal assembly. In a preferred embodiment the pressing devices support structure is secured to the skin removal assemblies support structure in order to revolve in unison therewith about the vertical main axis.

As an alternative to the multiple pressing devices in a revolving support structure as part of the carousel skin removal device, one can envisage embodiments wherein one or more stationary pressing devices are provided that do not revolve around the main axis. Such one or more stationary pressing devices can either be connected to the main frame of the carousel device or be entirely distinct therefrom, e.g. having a separate frame supporting the one or more stationary pressing devices.

For example one or more arc shaped pressure rods are arranged in a circular arc around a section of the carousel skin removal device, which one or more rods urge the poultry products onto the skin removal assemblies as they slide along the rod(s).

In an embodiment the pressing devices are arranged on the pressing devices support structure such that a pressing member of each pressing device is at a position radially outward of a skin removal assembly. The skin removal assemblies then each are arranged to contact a first side of the whole leg or drumstick poultry product, and each pressing member is adapted to directly engage on an opposed second side of the whole leg or drumstick poultry product so that the poultry product is pressed in generally inward direction onto the skin removal assembly.

In an alternative, less preferred, embodiment, the skin removal assemblies and pressing devices are arranged such in the carousel skin removal device that the poultry product engages the skin removal assembly substantially in a direction that is tangential to the revolving motion with the pressing force being substantial in tangential direction, e.g. the skin removal assembly in front of the poultry product when seen in direction of conveyance and the pressing member engaging on the poultry product from behind in the direction of conveyance.

In embodiments, e.g. when arranged in a revolving support structure as part of the carousel skin removal device, each pressing device comprises a mobile pressing member which is adapted to engage directly on the whole leg or drumstick poultry product as well as a corresponding actuator which is adapted to move the pressing member between a retracted position and an active pressing position. For example the actuator comprises a cam-track and cam-follower mechanism as is often seen in carousel poultry processing devices. In another example the actuator comprises a fluid operated actuator, e.g. a pneumatic cylinder.

In embodiments, when arranged in a revolving support structure as part of the carousel skin removal device, a single pressing device is common for the two whole leg or drumstick poultry products carried by a single poultry product carrier. For example, the pressing device comprises a pressing member engaging on two poultry products at the same time when actuated to move from a retracted position into an active position, with the retracted position being spaced from the skin removal assemblies over a distance significantly greater than the corresponding dimensions of the poultry product so that the products can easily be arranged against the skin removal assemblies before the actuation of the pressing member.

In embodiments a single pressing device comprises a mobile pressing member which is adapted to engage directly on the thigh portion of two whole leg poultry products carried by a single poultry product carrier.

In embodiments the system further comprises at least one skin collecting bin, wherein the main frame of the carousel skin removal device is embodied such that the skin collecting bin can be placed directly underneath the path of the multiple skin removal assemblies so that skin removed from the poultry part drops directly into the skin collecting bin. This also allows for a simple design as no equipment handling the skin between the skin removal assemblies and the bin is needed, e.g. no skin conveyor.

The present invention also relates to a carousel skin removal device for skin removal from defeathered whole leg or drumstick poultry products, which device is adapted to be located at a circle arc track portion of a poultry products conveyor and which device comprises:
  a track including said circle arc track portion,
  a series of poultry product carriers which are spaced apart from one another in the direction of the track and which are movable along said track, wherein each poultry product carrier is adapted to hold at least one defeathered whole leg or drumstick poultry product at the ankle joint thereof such that the poultry product is conveyed hanging from said carrier,
wherein the carousel skin removal device comprises:
  a main frame,
  a skin removal assemblies support structure, which is journaled on said main frame to revolve about a vertical main axis,
  a drive assembly adapted to cause a revolving of the skin removal assemblies support structure that is synchronized with the passage of the poultry product carriers along the circle arc track portion of the track,
wherein the skin removal assemblies support structure supports multiple skin removal assemblies in a circular arrangement thereon,
wherein each skin removal assembly is adapted to remove skin from a whole leg or drumstick poultry product and wherein each skin removal assembly comprises at least one rotary driven skinning roller having an axis of rotation and at least one counter skinning member adjacent said at least one skinning roller,
wherein the skin removal assemblies are distributed corresponding to the positions of the whole leg or drumstick poultry products held by the poultry product carriers of the conveyor in their passage along the circle arc track portion of the track, such that each skin removal assembly moves along with the whole leg or drumstick poultry product during the skin removal process.

In an embodiment the carousel skin removal device further comprises a pressing device adapted to cause a contact pressure between the whole leg or drumstick poultry product and the skinning roller and counter skinning member of a skin removal assembly. As explained it is also envisaged to make use of one or more pressing devices that do not revolve along with the carousel device and are located at one or more stationary locations along the path of the poultry products.

It will be appreciated that the carousel skin removal device may have any of the features discussed herein with reference to the system for skin removal.

In an embodiment the at least one counter skinning member adjacent said at least one skinning roller is embodied as a second skinning roller having an axis of rotation.

Preferably the skinning rollers have meshing teeth, e.g. helical teeth. The skinning rollers rotate in counter rotation during operation.

In an embodiment the main frame of the carousel skin removal device comprises a gear ring, preferably said gear ring being stationary mounted in the main frame, wherein a skin removal assembly comprises a pinion meshing with said gear ring, said one pinion being connected to the at least one driven skinning roller of said skin removal assembly.

In an embodiment each skin removal assembly has a housing supporting a pair of skinning rollers at an upper end thereof, e.g. with each skinning roller having, above a region provided with a skin removal profile, e.g. with meshing helical teeth, an upper shaft end that is mounted via one or more bearings in the housing.

In an embodiment the carousel drive assembly comprises a rotary conveyor coupling member that is secured to the skin removal assemblies support structure and is rotatable about the vertical main axis, which conveyor coupling member is provided with formations in a circular arrangement, which formations interlock with a poultry product carrier so that the conveyor coupling member, and thereby the skin removal support structure, is entrained by the passing poultry carriers and made to revolve about the vertical main axis.

In an embodiment the axes of rotation of the at least one rotary driven skinning roller in the skin removal assemblies are arranged vertically, or in a conical arrangement with the axes of rotation extending upward and inward at an angle of between 45° and 80° to the horizontal, preferably at an angle of between 60° and 80° to the horizontal.

The present invention also relates to a method for skin removal from defeathered whole leg or drumstick poultry products, wherein use is made of a system and/or carousel skin removal device as described herein.

BRIEF DESCRIPTION OF THE DRAWINGS

The invention will now be explained in more detail with reference to the drawings. In the drawings.

DETAILED DESCRIPTION OF THE INVENTION

With reference to the drawings embodiments of a system for skin removal from defeathered whole leg poultry products 1 will be described. As the skilled man will appreciate a similar system may be used for skin removal from defeathered drumsticks.

The system comprises poultry products conveyor comprising a track 10 having a circle arc track portion 10a, here a semi-circle arc track portion 10a adjoining straight track portions 10b, 10c respectively upstream and downstream of track portion 10a.

The poultry conveyor further comprises a series of poultry product carriers 2 which are spaced apart from one another in the direction of the track and which are movable along the track 1. For example the carriers 2 are connected to a chain, which chain is driven by a motor drive, preferably at a constant speed of conveyance.

As is known in the art each poultry product carrier 2 is adapted to hold at least one defeathered whole leg poultry product 1 at the ankle joint thereof such that the poultry product is conveyed hanging from said carrier 2. For example reference is made to U.S. Pat. No. 5,505,657.

As is preferred, each carrier 2 comprises a carrier base 3 that is guided, here embodied as a trolley having track engaging rollers 4, along the track 1 and a holding part 5 that is adapted to hold two whole leg poultry products 1 at the ankle joint in side-by-side hanging orientation. The holding part 5 may comprises two leg receiving openings therein, possibly and preferably provided with a commandable retention mechanism to keep the leg in the receiving opening with the ankle joint above the holding part and the whole leg or drumstick suspended below the holding part 5.

The holding part 5 is rotatable mounted relative to the carrier base about a vertical axis between indexed rotary positions which include a first rotary position, wherein the holding part 5 is transverse to the track 1, and a second rotary position, wherein the holding part is aligned with the track 1. As is known in the art, a locking mechanism may be present on the carrier to lock the holding part 5 in one or more of its rotary positions.

The system further comprises a carousel skin removal device 20 that is arranged along the track 10, at the circle arc portion 10a, of the poultry products conveyor. This device 20 is adapted to remove skin from products 1 held and conveyed by the poultry products conveyor. In this example the skin is removed from the thigh portion 1a of the whole leg product 1 whereas the skin remains on the drumstick 1b of the product 1.

The skin removal device 20 comprises a main frame 21, here with a cantilevered frame part 22 that supports the arc track portion 10a at an overhead position and with one or more legs 23 that support the frame part 22 on the floor.

The device 20 further comprises a skin removal assemblies support structure 25, which is journaled on the main frame 21 to revolve about a vertical main axis 26. As is preferred the main frame 21 has a vertical shaft 27 depending from the cantilevered frame part 22 with the lower end of the shaft spaced above the floor to allow a skin collecting bin 90 to pass underneath the shaft and to be arranged so as to collect the removed skin therein.

Figure 1:
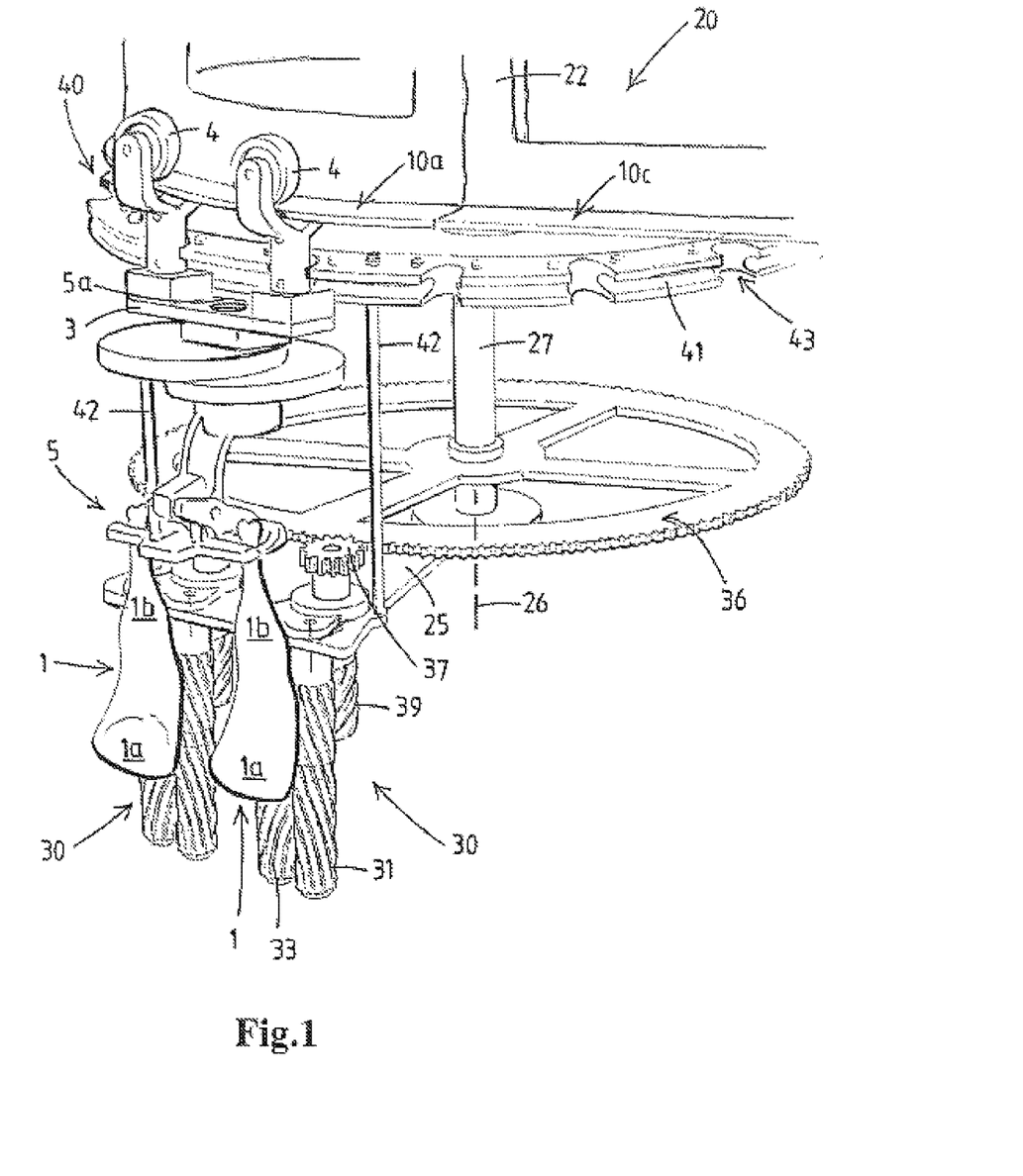
FIG. 1 shows a part of an embodiment of the system for skin removal from defeathered whole leg poultry products according to the invention.
Figure 2:
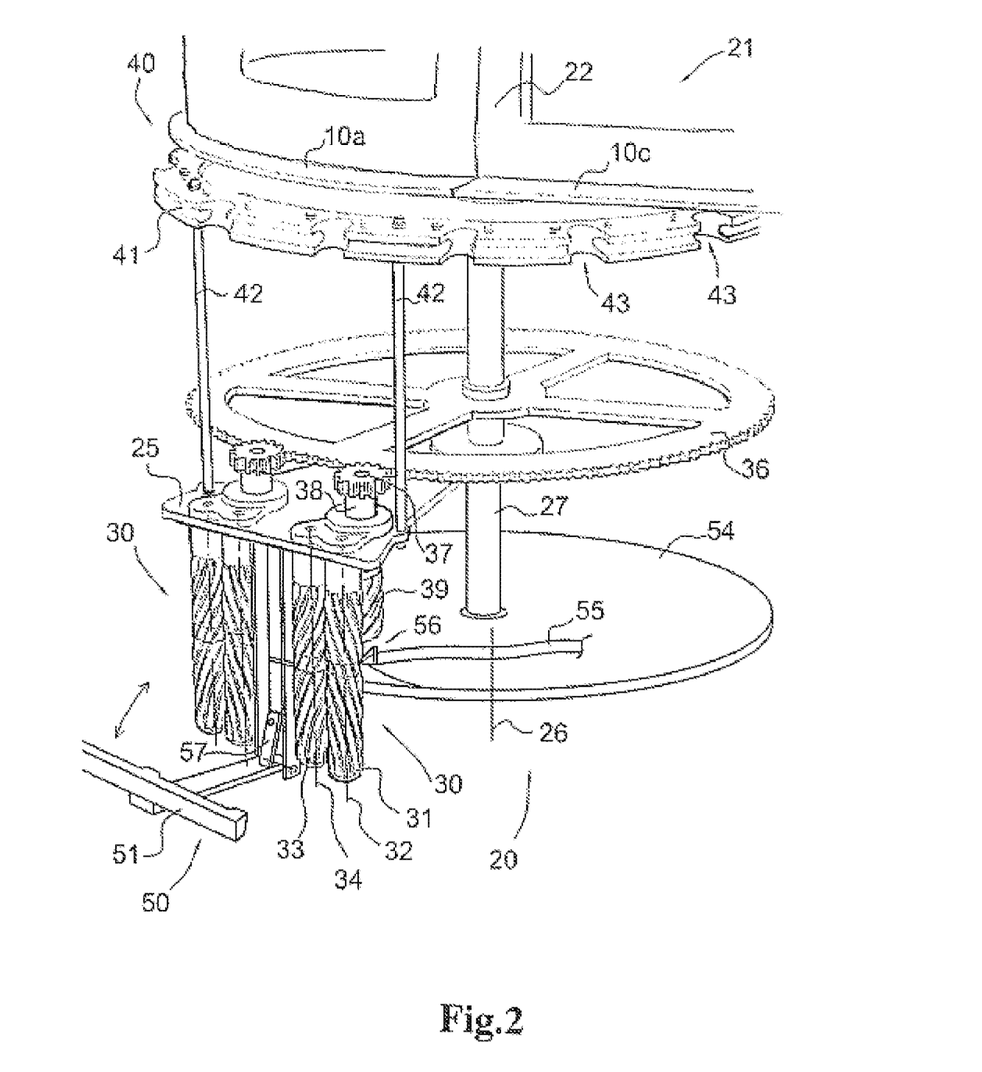
FIG. 2 shows in a view corresponding to FIG. 1 a part of the carousel device without the presence of the whole leg products and the carrier.
Figure 3:
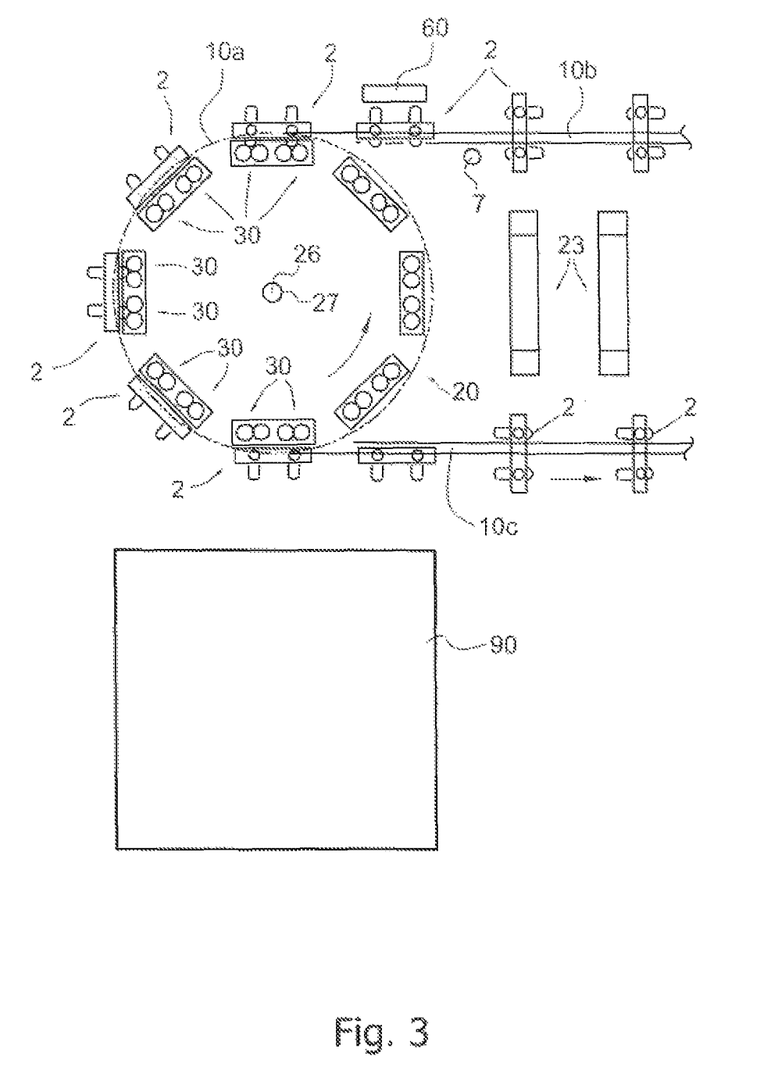
FIG. 3 shows schematically in view from above the system of FIG. 1, FIGS. 4-6 show different stages of the skin removal method performed with the system of FIGS. 1-3.

The revolving support structure 25 supports multiple pairs of skin removal assemblies 30, wherein each skin removal assembly is adapted to remove skin from a whole leg poultry product 1. FIG. 3 schematically shows the provision of 8 pairs of skin removal assemblies 30 in one device 20 but another number, preferably at least four assemblies 30, is also possible.

As can be seen in FIG. 3 the skin removal assemblies support structure 25 supports the multiple skin removal assemblies 30 in a circular arrangement thereon. The skin removal assemblies are distributed corresponding to the positions of the whole leg poultry products held by the poultry product carriers 2 of the conveyor in their passage along the circle arc track portion 10a of the track 10.

FIG. 3 schematically depicts that the system comprises an indexing member 7 cooperating with the holding part 5 of each arriving carrier 2 ahead of the skin removal carousel device 20 and bringing the holding part 5 in the second rotary position. In this second rotary position the leg products hanging side by side arrive generally tangential to the circle arc portion 10a. The leg products are maintained, preferably, in this position during the skin removal process.

A further indexing member 7, not shown, may be present to cause the holding part 5 to return to the first rotary position after the carrier 2 has moved away from the skin removal carousel device 20.

The device 20 comprises a drive assembly 40 that is adapted to cause a revolving motion of the skin removal assemblies support structure 25 that is synchronized with the passage of the poultry product carriers 2 along the circle arc track portion 10a of the track 10.

In the figures a drive assembly 40 is shown comprises a rotary conveyor coupling member 41 that is secured to the skin removal assemblies support structure 25, here via one or more rods 42 between the coupling member 41 and the lower arranged structure 25.

The conveyor coupling member 41 is rotatable about the vertical main axis 26 of the device 20 and is provided with formations 43 in a circular arrangement, which formations 43 (here indents in an outer circumference of a circular coupling member, interlock with a poultry product carrier 2 so that the conveyor coupling member 41, and thereby the skin removal support structure 25, is entrained by the passing poultry carriers and made to revolve about the vertical main axis.

It will be appreciated that each skin removal assembly 30 moves along with a whole leg poultry product 1 during the skin removal process which takes place during the passage along the arc portion 10a.

Each skin removal assembly 30 comprises at least one rotary driven skinning roller 31 having an axis of rotation 32 and at least one counter skinning member 33 adjacent the at least one skinning roller 31. As preferred, and as shown here, the at least one counter skinning member 33 is embodied as a second skinning roller having an axis of rotation 34.

As shown here the skinning rollers 31, 33 having meshing teeth, e.g. helical teeth, and the skinning rollers rotate in counter rotation during operation. This embodiment allows to exert a skin removal force on the skin that has a significant downward component, so that the skin pulling action includes a significant downward force.

In this example, as is preferred, the axis 32 and 34 are parallel. In an embodiment with conical skinning rollers as known in the art the axis may be non-parallel corresponding to the conical shape of the skinning rollers.

The main frame 21 of the carousel skin removal device 20 comprises a gear ring 36. Here—as is preferred—this gear ring 36 is stationary mounted in the main frame 21, here on shaft 27.

Each skin removal assembly 30 comprises a pinion 37 meshing with the gear ring 36, which one pinion 37 is connected to the at least one driven skinning roller 31 of the skin removal assembly 30. In the embodiment shown here each pinion 37 is fitted on a shaft 38 that carries a helical tooth pinion 39 meshing with the roller 31.

The carousel skin removal device 20 further comprises multiple pressing devices 50 that are supported by a pressing devices support structure 25 in a circular arrangement thereon. In this embodiment one pressing device 50 is provided per pair of skin removal assemblies 30. Also in this embodiment the pressing devices 50 are mounted on the structure 25 so that said structure also acts as pressing devices support structure. Thereby this support structure for the pressing devices 50 is also journaled on the main frame to revolve about the vertical main axis and is adapted to revolve synchronized with the skin removal assemblies support structure.

Generally each pressing device 50 is adapted to cause a contact pressure between—on the one hand—two whole leg poultry products 1 held by a poultry product carrier 2 of the conveyor whilst passing along the circle arc track portion 10a of the track and—on the other hand—the skinning rollers of a skin removal assembly 30.

Each pressing device 50 includes a pressing member 51 that is here embodied to engage on two whole leg products 1 held by a single carrier 2.

The pressing members 51 are generally arranged radially outward of the skin removal assemblies 30, so that the skin removal assemblies 30 each are arranged to contact a first side of the whole leg poultry product 1 and each pressing member 51 is adapted to directly engage on an opposed second side of the whole leg poultry product. Thus the pressing members 51 effectively press the leg products radially inward onto the corresponding skin removal assemblies 30.

The pressing members 51 are embodied as mobile pressing members, each adapted to engage directly on the whole leg poultry product 1. For each pressing member 51 a corresponding actuator is provided in the device 20, which is adapted to move the pressing member between a retracted position and an active pressing position.

In the figures it can be seen that in an embodiment the actuation of the pressing member is based on a cam/cam follower mechanism. Here a stationary cam disc 54 is mounted in the main frame at a level below the support structure 25, with the disc 54 having a cam track 55.

The pressing device 50 includes a cam follower 56 that engages the cam track 56 and that is linked by a mechanical linkage 57 to the mobile pressing member 51.

Here the pressing member 51 has an arm 51a that is at a lower end thereof pivotally connected to the support about a horizontal pivot axis 58.

Figure 4:
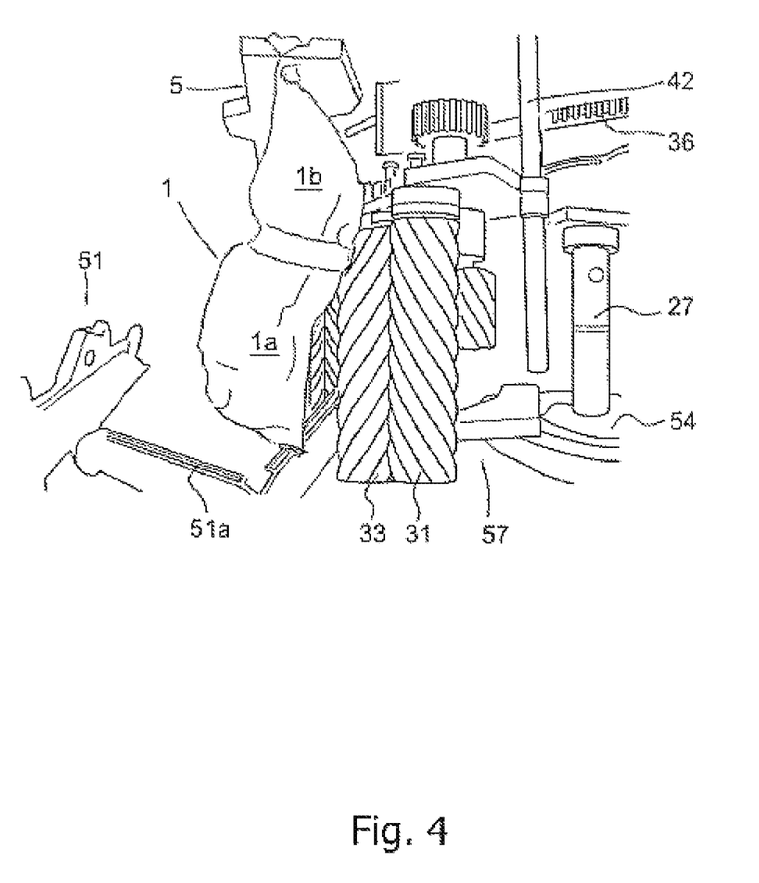
Figure 5:
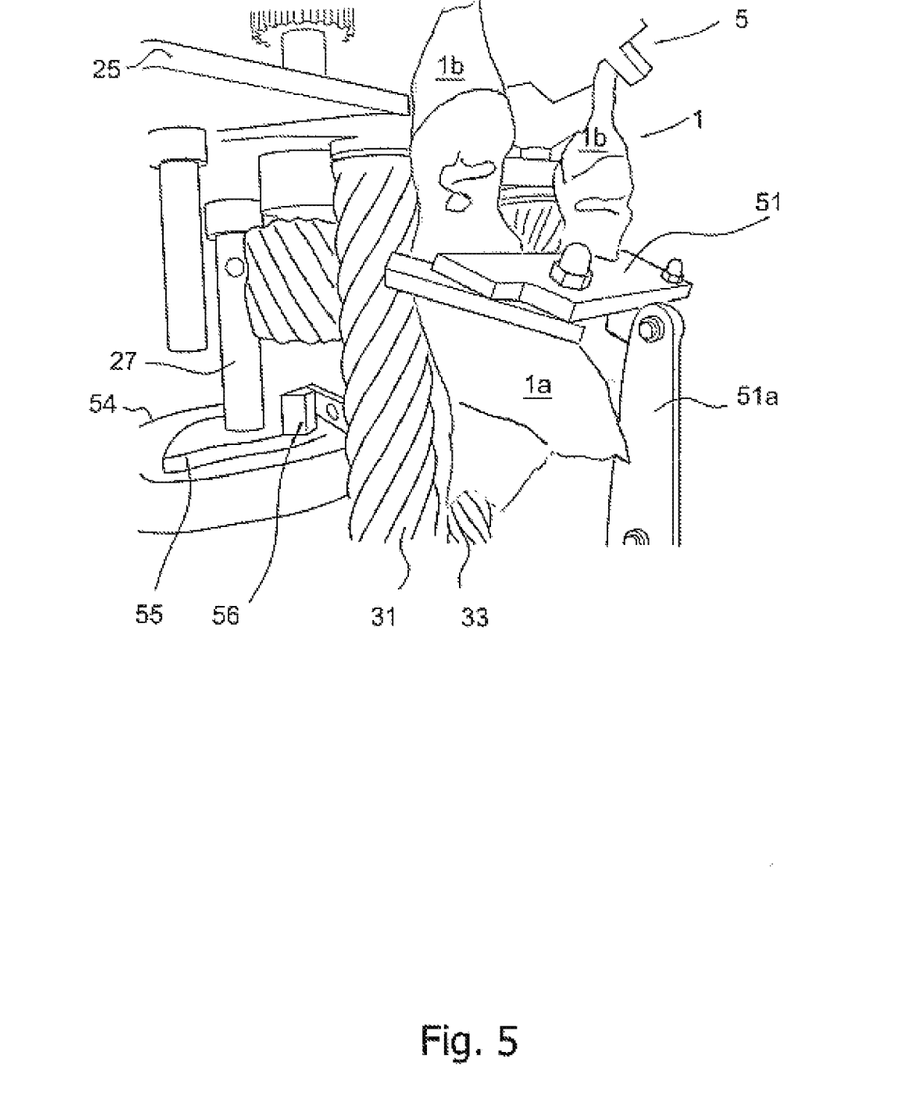
Figure 6:
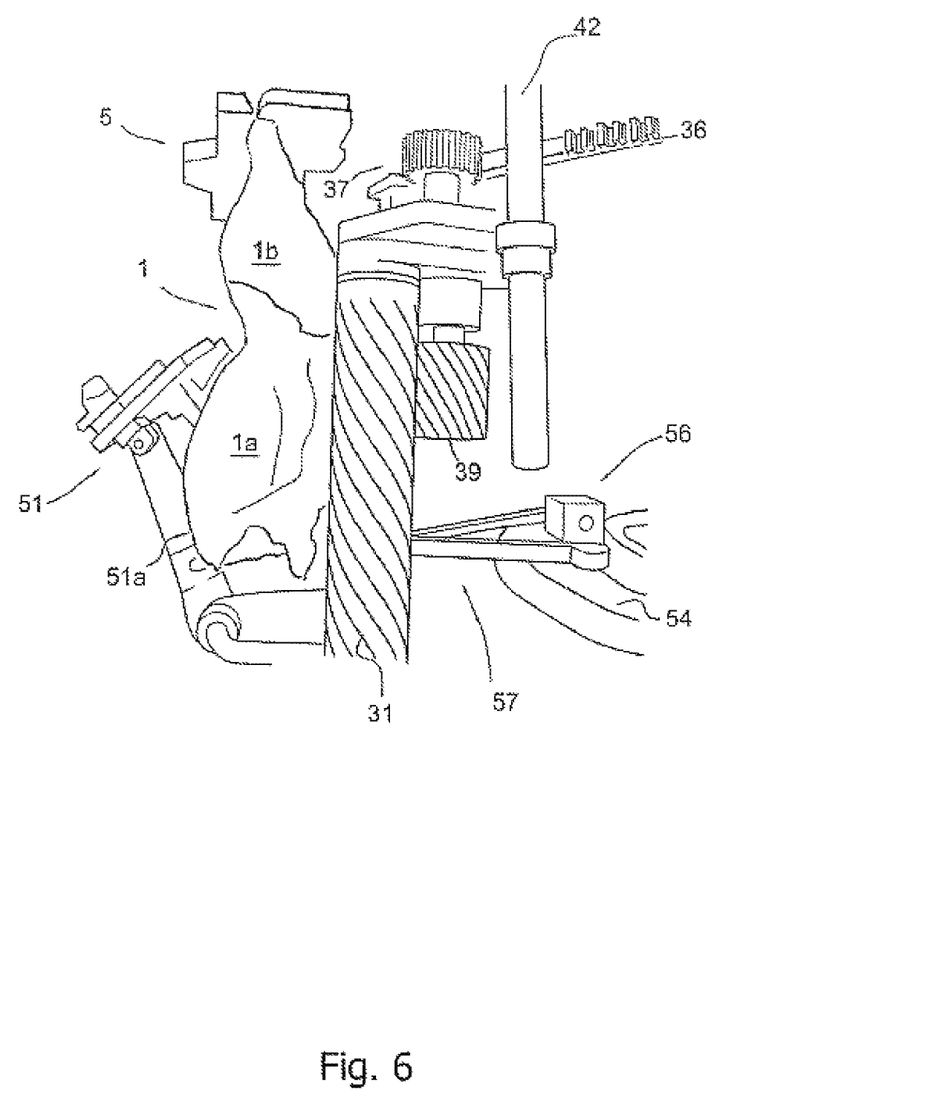

As indicated above, and as can be seen best in FIGS. 4-6, the skin removal assemblies 30 here are arranged to solely remove skin from the thigh of a whole leg poultry product. Each skin removal assembly 30 is arranged at a distance below the path of the carriers 2, which distance is such that the drumstick of a whole leg poultry product carried by the poultry product carrier 2 is not engaged by the skinning rollers of the skin removal assembly 30.

As an alternative one could also arrange the skin removal assembly so that it may be in contact with both the drumstick and the thigh portion of the poultry product and then provide a shield member on the device 20 to act between the drumstick and the skin removal assembly, e.g. a movable or removable shield member so that skinning of the drumstick can be performed if desired.

As is shown here, the mobile pressing member 51 is adapted to engage solely and directly on a thigh of a whole leg poultry product 1 carried by the poultry product carrier 2.

As is shown here a single pressing device 50 is common for the two whole leg poultry products 1 carried by a single poultry product carrier 2. Also the mobile pressing member is adapted to engage directly on, and here only on, the thigh portions of two whole leg poultry products 1 carried by a single poultry product carrier 2.

Figure 7:
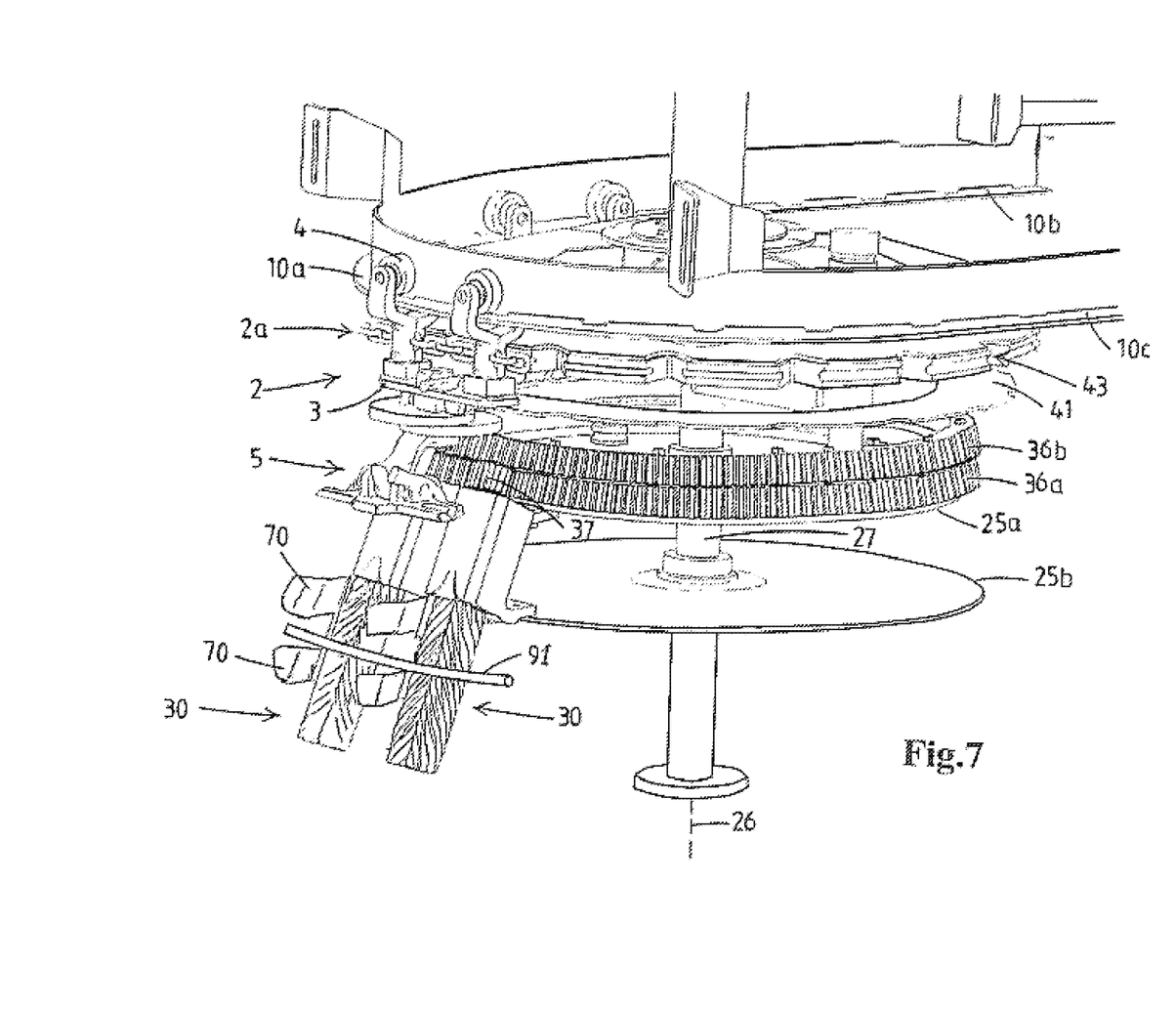
FIG. 7 shows another embodiment of a system for skin removal from defeathered whole leg poultry products according to the invention.
Figure 8:
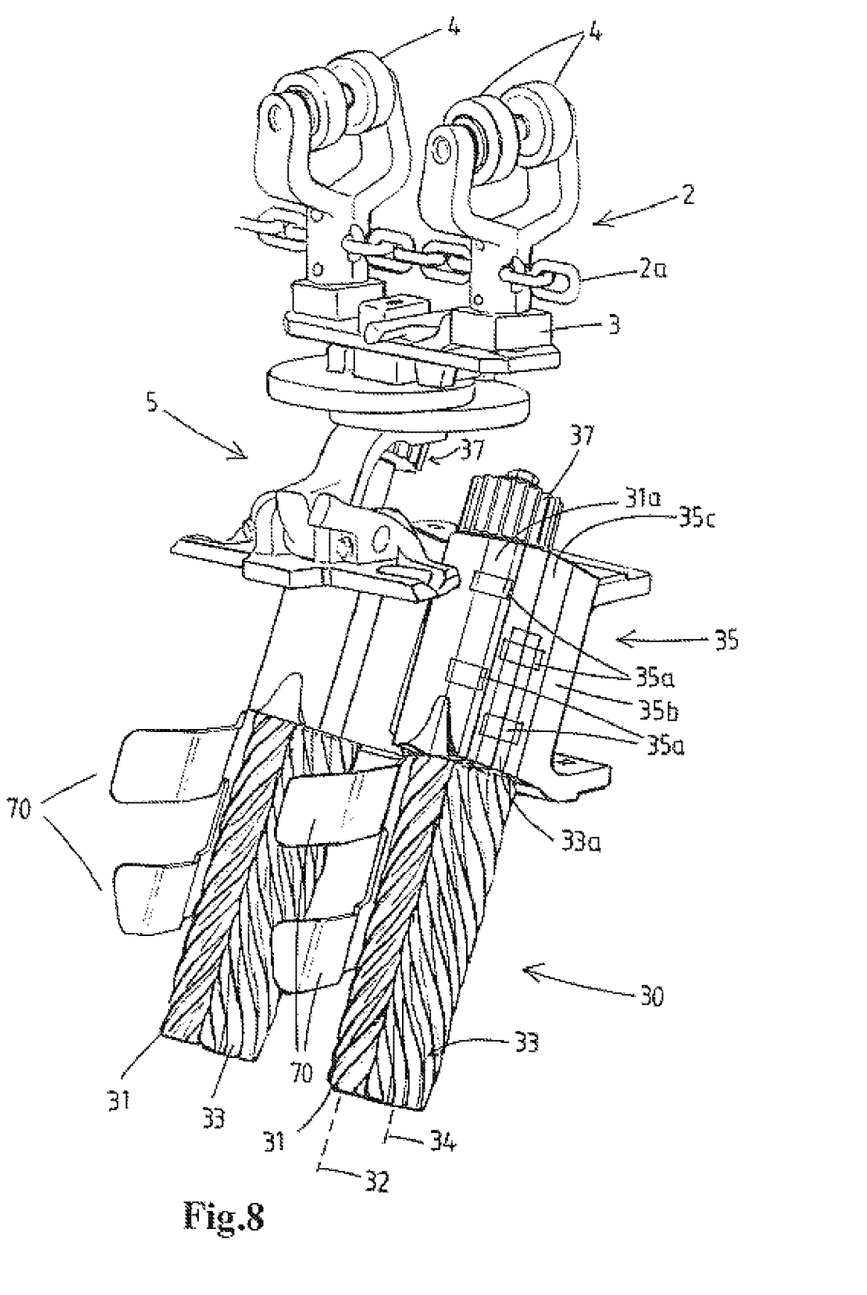
FIG. 8 shows a poultry product carrier and a skin removal assembly of the system of FIG. 7.

As is shown here the axes of rotation 32, 34 of the at least one rotary driven skinning roller in the skin removal assemblies 30 are arranged vertically, so generally parallel to the axis 26 of the main frame. As mentioned a conical arrangement of the skin removal assemblies 30 in the device 20 with the axes of rotation of the skinning rollers 31 extending upward and inward at an angle of between 45° and 80° to the horizontal, preferably at an angle of between 60° and 80° to the horizontal, is also envisaged. An example thereof is illustrated in FIGS. 7, 8.

In view of the desire to only remove the skin from the thigh a cutting device 60 is arranged upstream of the device 20 along the track 10. This device 60 here is embodied to make a cut in the whole leg product 1 at the level of the knee joint. In the FIGS. 4-6 it can be seen that a cut has been made through the skin, so as to separate, or allow for easy separation between, the skin on the thigh and the skin on the drumstick. It is noted that this cut need not completely separate the skin portions. If some skin connection remain the skin removal assembly will be able to cause the tearing thereof.

In the skin removal process the whole leg parts 30 carried by a carrier 2 each come into a position in front of a skin removal assembly 30 of a pair of such assemblies 30. Then the pressing device 50 is operated so that the mobile member 51 moves into its operative position and presses the thigh onto the skinning rollers 31, 33. As this all takes place during motion of the conveyor and thus revolution of the support structure 25, the skinning rollers 31, 33 remain in engagement with the leg product throughout the skin removal process.

The rotating skinning rollers 31, 33 engage on the thigh skin only which has been separated from the drumstick skin by the cut and pull the thigh skin into the nip between the rollers 31, 33 and pull it completely from the thigh. Then the removed thigh skin drops directly into the collecting bin 90 that is arranged below the carousel device 20 during operation. In an embodiment (not shown) the device 20 has a collecting plate below the path of the assemblies 30 so that removed skin drops on the collecting plate. The device 20 may then have a wiper that revolves with the device 20 and wipes the dropped skin into a collecting bin below said collecting plate.

The skinning rollers 31, 33 can be operated at relatively low rotational speed as there is sufficient time to perform the removal of the skin during the passage along the arc portion 10a. This allows for enhanced skin removal and avoids damage to the underlying meat.

Compared to the mentioned prior art solutions the period of engagement between the skinning rollers 31, 33 and the leg product 1 is relatively longer which allows for enhanced quality of the skin removal process.

With reference to FIGS. 7, 8 now another embodiment of a skin removal system according to the invention will be discussed. Parts having the same function as parts discussed with reference to the FIGS. 1-6 have been denoted with the same reference numerals. It will be appreciated that whilst only two assemblies 30 are shown (for clarity), the carousel device will be equipped with several pairs of assemblies 30 around its circumference.

The device 20 shown here is also designed to remove skin solely from the thigh of the poultry leg product, with the drumstick being kept away from the skinning rollers.

It is illustrated here that the axes of rotation of the skinning rollers 31,33 extend upward and inward at an angle of between 45° and 80° to the horizontal, preferably at an angle of between 60° and 80° to the horizontal. This inclined orientation of the skinning rollers 31, 33, which—in this example—are of generally cylindrical design with meshing helical teeth thereon as is preferred, allows for enhanced engagement of the poultry product with the skinning rollers.

In FIGS. 7, 8 it is illustrated that in a pair of adjacent skin removal assemblies 30 the leading assembly 30 is arranged at a smaller radius relative to the axis 26 than the trailing assembly 30. This arrangement enhances the engagement of the assemblies 30 with the pair of legs that are held side by side in a common holding part 5.

In FIGS. 7, 8 it is illustrated that there are two gear rings 36a, 36b above one another, the one ring 36a cooperating with the pinion 37 of the leading assembly 30 of each pair of assemblies 30 and the other ring 36b cooperating with the pinion 37 of the trailing assembly 30 of each pair. This embodiment is in particular advantageous with the leading and trailing assemblies 30 at different radiuses relative to the axis 26 as explained above.

In FIGS. 7, 8 it is illustrated that each skin removal assembly 30 has a housing 35 supporting the pair of skinning rollers 31, 33 at an upper end thereof, e.g. with each roller 31, 33 having, above the region provided with skin removal profile, an upper shaft end 31a, 33a that is mounted via one or more bearings 35a in the housing 35. This is schematically shown in FIG. 8.

In FIGS. 7, 8 it is illustrated that the pinion 37 is fitted on upper shaft end 31a which here protrudes above the housing 35.

In FIGS. 7, 8 it is illustrated that each skin removal assembly 30 has a housing 35 with a housing base 35b and a housing cover 35c, the cover 35 being removable from the base 35b allowing the replacement of the one or more skinning rollers 31, 33 and/or bearings 35a.

In FIGS. 7, 8 it is illustrated that each skin removal assembly 30 has a housing 35 supporting the pair of skinning rollers 31, 33 at an upper end thereof at an incline so that the axes of rotation 32, 34 of the skinning rollers 31,33 extend upward and inward at an angle of between 45° and 80° to the horizontal. Each housing 35 is mounted on the support structure 25 so as to revolve about vertical main axis 26.

Here the structure 25 comprises two discs 25a, 25b spaced above one another, with the housing 35 being secured to each disc 25a, 25b. The one or more gears 36a, b are held stationary above the upper disc 25a.

FIGS. 7, 8 illustrate the provision of one or more poultry product positioning members 70, preferably stationary mounted relative to each assembly 30, which serve to assist in the positioning of the poultry leg product relative to the assembly 30, here relative to the pair of skinning rollers 31, 33.

It is illustrated here to provide such a member 70 at the trailing side of the pair of skinning rollers, such that it provides support for a poultry product to keep the poultry product aligned with the skinning rollers 31, 33.

FIG. 7 also illustrates the provision of one or more arc shaped rods 91 that are arranged in an arc along a section of the skin removal device 20. The one or more rods 91 urge the poultry products onto the skin removal assemblies 30 as the poultry products slide along the rod(s). In another embodiment of a stationary mounted pressure device, one can envisaged a resiliently mounted pressure plate or disc that is arranged in the path of the passing poultry parts and that urges the poultry part into intimate contact with the skin removal assembly as the part passes the pressure plate or disc.

Figure 9:
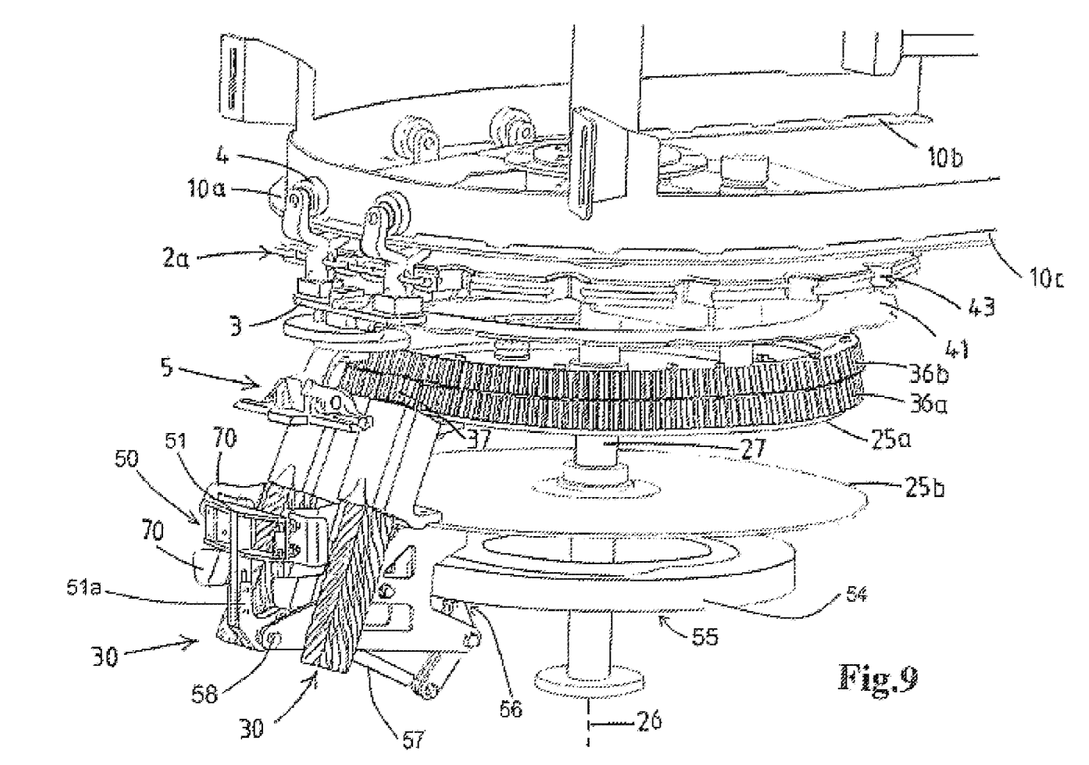
FIG. 9 shows another embodiment of a system for skin removal from defeathered whole leg poultry products according to the invention.

FIG. 9 shows another embodiment of a system for skin removal from defeathered whole leg poultry products according to the invention. Parts having the same function as parts discussed with reference to any of FIGS. 1-7 have been denoted with the same reference numerals. It will be appreciated that whilst only two assemblies 30 are shown (for clarity), the carousel device will be equipped with several pairs of assemblies 30 around its circumference.

Compared to the FIG. 7 embodiment it will be appreciated that FIG. 9 envisages the provision of multiple pressing devices 50 instead of the one or more stationary arranged rods 91.

The multiple pressing devices 50 that are supported by a pressing devices support structure 25, here lower disc 25b, in a circular arrangement thereon. One pressing device 50 is provided per pair of skin removal assemblies 30.

Generally each pressing device 50 is adapted to cause a contact pressure between—on the one hand—two whole leg poultry products 1 held by a poultry product carrier 2 of the conveyor whilst passing along the circle arc track portion 10a of the track and—on the other hand—the skinning rollers of a skin removal assembly 30. Each pressing device 50 includes a pressing member 51 that is here embodied to engage on two whole leg products 1 held by a single carrier 2. The pressing members 51 effectively press the leg products radially inward onto the corresponding skin removal assemblies 30.

The actuation of the pressing member 51 is based on a cam-track and cam-follower mechanism. Here a stationary cam disc 54 is mounted in the main frame at a level below the support structure 25a, 25b, with the disc 54 having a cam track 55 on the underside. The pressing device 50 includes a cam follower 56 that engages the cam track 56 and that is linked by a mechanical linkage 57 to the mobile pressing member 51.

Here the pressing member 51 has an arm 51a that is at a lower end thereof pivotally connected to the support about a horizontal pivot axis 58.

As indicated above, the skin removal assemblies 30 here are arranged to solely remove skin from the thigh of a whole leg poultry product. Each skin removal assembly 30 is arranged at a distance below the path of the carriers 2, which distance is such that the drumstick of a whole leg poultry product carried by the poultry product carrier 2 is not engaged by the skinning rollers of the skin removal assembly 30. As is shown here, the mobile pressing member 51 is adapted to engage solely and directly on a thigh of a whole leg poultry product 1 carried by the poultry product carrier 2.

The invention claimed is:

1. A system for skin removal from defeathered whole leg or drumstick poultry products, wherein the system comprises:
    a poultry products conveyor comprising:
        a track; and
        a series of poultry product carriers which are spaced apart from one another in the direction of the track and which are movable along said track, wherein each poultry product carrier is adapted to hold at least one defeathered whole leg or drumstick poultry product at the ankle joint thereof such that the poultry product is conveyed hanging from said carrier; and
    a skin removal device arranged along the track of the poultry products conveyor and adapted to remove skin from whole leg or drumstick poultry products held and conveyed by said poultry products conveyor, wherein the skin removal device comprises:
        multiple skin removal assemblies, wherein each skin removal assembly is adapted to remove skin from a whole leg or drumstick poultry product and wherein each skin removal assembly comprises at least one rotary driven skinning roller having an axis of rotation and at least one counter skinning member adjacent said at least one skinning roller; and
        a pressing device adapted to cause a contact pressure between the whole leg or drumstick poultry product and the skinning roller and counter skinning member of a skin removal assembly,
    wherein the poultry products conveyor is provided with a circle arc track portion,
    wherein the skin removal device comprises a carousel skin removal device which is arranged at said circle arc track portion,
    wherein the carousel skin removal device comprises:
        a main frame;
        a skin removal assemblies support structure, which is journaled on said main frame to revolve about a vertical main axis; and
        a drive assembly adapted to cause a revolving motion of the skin removal assemblies support structure that is synchronized with the passage of the poultry product carriers along the circle arc track portion of the track, and
    wherein the skin removal assemblies support structure supports said multiple skin removal assemblies in a circular arrangement thereon, wherein the skin removal assemblies are distributed corresponding to the positions of the whole leg or drumstick poultry products held by the poultry product carriers of the conveyor in their passage along the circle arc track portion of the track, such that each skin removal assembly moves along with a whole leg or drumstick poultry product during the skin removal process.

2. The system according to claim 1, wherein the skin removal assemblies are arranged to solely remove skin from the thigh of a whole leg poultry product, and wherein the skin removal assemblies are arranged at a distance below the path of the carriers which is such that the drumstick of a whole leg poultry product carried by the poultry product carrier is not engaged by the skinning roller of the skin removal assembly.

3. The system according to claim 1, wherein each poultry product carrier comprises a carrier base guided along the track and a holding part that is adapted to hold two whole leg or drumstick poultry products at the ankle joint in side-by-side hanging orientation, wherein the holding part is rotatable mounted relative to the carrier base about a vertical axis between indexed rotary positions, which include a first rotary position, wherein the holding part is transverse to the track, and a second rotary position, wherein the holding part is aligned with the track, wherein the system comprises an indexing member cooperating with the holding part ahead of the skin removal carousel device and bringing the holding part in the second rotary position.

4. The system according to claim 1, wherein the at least one counter skinning member adjacent said at least one skinning roller is embodied as a second skinning roller having an axis of rotation.

5. The system according to claim 1, wherein the main frame of the carousel skin removal device comprises a gear ring, and wherein a skin removal assembly comprises a pinion meshing with said gear ring, said one pinion being connected to the at least one driven skinning roller of said skin removal assembly.

6. The system according to claim 4, wherein the main frame of the carousel skin removal device comprises a gear ring, and wherein a skin removal assembly comprises a pinion meshing with said gear ring, said one pinion being connected to the at least one driven skinning roller of said skin removal assembly, and
- wherein each skin removal assembly has a housing supporting the pair of skinning rollers at an upper end thereof, with each skinning roller having, above a region provided with a skin removal profile, an upper shaft end that is mounted via one or more bearings in the housing.

7. The system according to claim 1, wherein the carousel drive assembly comprises a rotary conveyor coupling member that is secured to the skin removal assemblies support structure and is rotatable about the vertical main axis, which conveyor coupling member is provided with formations in a circular arrangement, which formations interlock with a poultry product carrier so that the conveyor coupling member, and thereby the skin removal support structure, is entrained by the passing poultry product carriers and made to revolve about the vertical main axis.

8. The system according to claim 1, wherein the axes of rotation of the at least one rotary driven skinning roller in the skin removal assemblies are arranged vertically, or in a conical arrangement with the axes of rotation extending upward and inward at an angle of between 45° and 80° to the horizontal.

9. The system according to claim 1, wherein the system comprises one or more pressing devices that is/are stationary mounted so as to not revolve about the vertical main axis, which one or more pressing devices are adapted to cause a contact pressure between one or more whole leg or drumstick poultry products held by a poultry product carrier of the conveyor whilst passing along the circle arc track portion of the track and the skinning roller and counter skinning member of a skin removal assembly.

10. The system according to claim 1, wherein the carousel skin removal device further comprises:
- multiple pressing devices supported by a pressing devices support structure in a circular arrangement thereon, which pressing devices support structure is journaled on said main frame to revolve about said vertical main axis and is adapted to revolve synchronized with the skin removal assemblies support structure wherein said pressing devices support structure is secured to the skin removal assemblies support structure in order to revolve in unison therewith about the vertical main axis, and
- wherein each pressing device is adapted to cause a contact pressure between one or more whole leg or drumstick poultry products held by a poultry product carrier of the conveyor whilst passing along the circle arc track portion of the track and the skinning roller and counter skinning member of a skin removal assembly.

11. The system according to claim 10, wherein the pressing devices each include a pressing member that is arranged radially outward of the skin removal assembly, wherein the skin removal assemblies each are arranged to contact a first side of the whole leg or drumstick poultry product, and wherein each pressing member is adapted to directly engage on an opposed second side of the whole leg or drumstick poultry product.

12. The system according to claim 10, wherein each pressing device comprises a mobile pressing member, which is adapted to engage directly on the whole leg or drumstick poultry product, as well as a corresponding actuator, which is adapted to move the pressing member between a retracted position and an active pressing position.

13. The system according to claim 11, wherein each pressing device comprises a mobile pressing member, which is adapted to engage directly on the whole leg or drumstick poultry product, as well as a corresponding actuator, which is adapted to move the pressing member between a retracted position and an active pressing position, and
- wherein the mobile pressing member is adapted to engage solely and directly on a thigh of a whole leg poultry product carried by the poultry product carrier.

14. The system according to claim 3, wherein the pressing devices each include a pressing member that is arranged radially outward of the skin removal assembly, wherein the skin removal assemblies each are arranged to contact a first side of the whole leg or drumstick poultry product, and wherein each pressing member is adapted to directly engage on an opposed second side of the whole leg or drumstick poultry product, and
- wherein a single pressing device is common for the two whole leg or drumstick poultry products carried by a single poultry product carrier.

15. The system according to claim 1, wherein the system further comprises a skin collecting bin, and wherein the main frame of the carousel skin removal device is embodied such that the skin collecting bin can be placed directly underneath the path of the multiple skin removal assemblies so that skin removed from the poultry part drops directly into the skin collecting bin.

16. A carousel skin removal device for skin removal from defeathered whole leg or drumstick poultry products, which device is adapted to be located at a circle arc track portion of a poultry products conveyor comprising:
- a track including said circle arc track portion; and
- a series of poultry product carriers which are spaced apart from one another in the direction of the track and which are movable along said track, wherein each poultry product carrier is adapted to hold at least one defeathered whole leg or drumstick poultry product at the ankle joint thereof such that the poultry product is conveyed hanging from said carrier,
- wherein the carousel skin removal device comprises:
  - a main frame;
  - a skin removal assemblies support structure, which is journaled on said main frame to revolve about a vertical main axis; and
  - a drive assembly adapted to cause a revolving of the skin removal assemblies support structure that is synchronized with the passage of the poultry product carriers along the circle arc track portion of the track,
- wherein the skin removal assemblies support structure supports multiple skin removal assemblies in a circular arrangement thereon,
- wherein each skin removal assembly is adapted to remove skin from a whole leg or drumstick poultry product and wherein each skin removal assembly comprises at least one rotary driven skinning roller having an axis of rotation and at least one counter skinning member adjacent said at least one skinning roller, and
- wherein the skin removal assemblies are distributed corresponding to the positions of the whole leg or drumstick poultry products held by the poultry product carriers of the conveyor in their passage along the circle arc track portion of the track, such that each skin removal assembly moves along with the whole leg or drumstick poultry product during the skin removal process.

17. A method for skin removal from defeathered whole leg or drumstick poultry products, said method comprising the step of using the system according to claim 1 to remove skin from the defeathered whole leg or drumstick poultry products.

18. The system according to claim 1, wherein the at least one counter skinning member adjacent said at least one skinning roller is embodied as a second skinning roller having an axis of rotation, said skinning rollers having meshing teeth, and said skinning rollers rotating in counter rotation during operation.

19. The system according to claim 1, wherein the main frame of the carousel skin removal device comprises a gear ring, said gear ring being stationary mounted in the main frame, and wherein a skin removal assembly comprises a pinion meshing with said gear ring, said one pinion being connected to the at least one driven skinning roller of said skin removal assembly.

20. The system according to claim 1, wherein the system comprises one or more pressing devices that is/are stationary mounted so as to not revolve about the vertical main axis, which one or more pressing devices are adapted to cause a contact pressure between on the one or more whole leg or drumstick poultry products held by a poultry product carrier of the conveyor whilst passing along the circle arc track portion of the track and the skinning roller and counter skinning member of a skin removal assembly, and wherein one or more arc shaped rods are arranged in an arc around a section of the skin removal device, which one or more rods urge the poultry products onto the skin removal assemblies as the poultry products slide along the rod(s).

* * * * *